US011153556B1

(12) United States Patent
Rodrigues et al.

(10) Patent No.: US 11,153,556 B1
(45) Date of Patent: Oct. 19, 2021

(54) VOLUMETRIC ACCESSING OF A VOLUMETRIC DISPLAY

(71) Applicant: Toyota Motor Engineering & Manufacturing North America, Inc., Plano, TX (US)

(72) Inventors: Sean Rodrigues, Ann Arbor, MI (US); Ercan Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/836,036

(22) Filed: Mar. 31, 2020

(51) Int. Cl.
*H04N 13/388* (2018.01)
*G02B 30/56* (2020.01)
*B60K 35/00* (2006.01)
*H04N 13/322* (2018.01)

(52) U.S. Cl.
CPC .......... *H04N 13/388* (2018.05); *B60K 35/00* (2013.01); *G02B 30/56* (2020.01); *H04N 13/322* (2018.05); *B60K 2370/1531* (2019.05)

(58) Field of Classification Search
CPC .... H04N 13/388; H04N 13/322; G02B 30/56; B60K 35/00; B60K 2370/1531
See application file for complete search history.

(56) References Cited

U.S. PATENT DOCUMENTS

| | | | |
|---|---|---|---|
| 5,481,523 A | 1/1996 | Dewald | |
| 5,572,375 A * | 11/1996 | Crabtree, IV | G02B 30/50 |
| | | | 359/858 |
| 2013/0314416 A1* | 11/2013 | Kuhlman | H04N 13/388 |
| | | | 345/424 |
| 2015/0355461 A1* | 12/2015 | Kessler | G02B 27/0081 |
| | | | 359/631 |
| 2018/0231702 A1 | 8/2018 | Lin et al. | |
| 2019/0196172 A1 | 6/2019 | Hillman | |
| 2019/0287495 A1* | 9/2019 | Mathur | G06T 15/00 |
| 2020/0142207 A1* | 5/2020 | Chin | H04N 13/32 |
| 2020/0166783 A1* | 5/2020 | Roy | B82Y 20/00 |
| 2020/0409151 A1* | 12/2020 | Calafiore | G02B 27/4272 |

FOREIGN PATENT DOCUMENTS

| | | |
|---|---|---|
| JP | 2000000893 A | 1/2000 |
| JP | 2009251236 A | 10/2009 |
| KR | 101729670 B1 | 4/2017 |
| WO | 2018165613 A1 | 9/2018 |

* cited by examiner

*Primary Examiner* — James T Boylan (74) *Attorney, Agent, or Firm* — Jordan IP Law, LLC (57) ABSTRACT

Methods and systems may provide for 3D volumetric displays. Such 3D volumetric displays may include a transparent enclosed volume holding a gas as a stationary gain medium. A scanning mirror may direct a light beam from a light source. A voxel projector may receive the light beam from the scanning mirror and may project an expanded beam into a volume of the stationary gain medium. Changes in the X and Y orientation between the light beam from the scanning mirror and the voxel projector results in relatively larger changes in the X and Y dimension of the expanded beam that is projected into the volume of the stationary gain medium to produce a 3D image.

20 Claims, 11 Drawing Sheets

VOLUMETRIC ACCESSING OF A VOLUMETRIC DISPLAY

TECHNICAL FIELD

Embodiments generally relate to three-dimensional (3D) volumetric displays. More particularly, embodiments relate to 3D volumetric displays using a beam expansion to increase the volume accessible when producing a 3D image.

BACKGROUND

There are many district technologies for the creation of a three-dimensional (3D) image. Typically, these district technologies for creation of a 3D image fall into three approaches: free space displays, swept volume displays, and static volumetric displays. Due to these technologies taking district approaches, the technological approaches utilized for free space displays and/or swept volume displays often are not applicable or easily adapted for static volumetric displays.

Free space displays often operate in open air, with no barrier between the 3D image and a user. For example, such free space displays may utilize trapped particles, free particle, or plasma emission technologies to create the 3D image.

Swept volume displays often operate with a rotating emissive or reflective/diffractive screen. Such a rotating emissive or reflective screen may fuse a series of slices of the 3D object into a single 3D image by creating an optical illusion that relies on the human persistence of vision. For example, such swept volume displays may utilize spinning LEDs, illuminated spinning paddles, or translating projection surfaces to create the 3D image.

Static volumetric displays are devices that display a 3D image within a static volume. There are many different methods of producing a volumetric display, such as illuminating a doped material with a probe laser, illuminating a gain medium with a probe laser, etc.

In the case of static volumetric displays, traditional raster scanning that has been demonstrated for cathode ray tubes is often utilized. However, such traditional raster scanning may be too slow to achieve the large scale data accessing for 3D displays that is necessary. For example, it may be too difficult to raster scan X and Y locations of a volume using a mirror due to the slow speed of the galvanometric system that is controlling the mirror. Such slow mirror speed may be due to the lack of a fine notch motor and/or servo actuator for mirror assemblies. It also may be difficult to raster scan a volume with a set of X,Y direction mirrors.

BRIEF SUMMARY

In one embodiment, an apparatus for 3D volumetric display, includes a transparent enclosed volume, a light source, a scanning mirror, and a voxel projector. The transparent enclosed volume holds a gas as a stationary gain medium. The scanning mirror is configured to direct a light beam from the light source in an X and a Y dimension. The voxel projector is configured to receive the light beam from the scanning mirror and project an expanded beam into the transparent enclosed volume of the stationary gain medium. A change in the orientation of the scanning mirror to direct the light beam from the light source covers a first area in the X and Y dimension of the transparent enclosed volume when not modified by the voxel projector, and covers a second, larger area in the X and Y dimension of the transparent enclosed volume when modified by the voxel projector.

In some implementations of the apparatus, the voxel projector includes a grating structure, where an individual surface structure pattern within the grating structure is at a scale of between 1-10 microns.

In some implementations of the apparatus, the voxel projector includes a metasurface structure, where an individual surface structure pattern within the metasurface structure is at a scale of between 100-900 nanometers.

In some implementations of the apparatus, the voxel projector is stationary. Orientation changes by the scanning mirror control the relatively larger changes in the X and Y dimension of the expanded beam that is projected into the volume of the stationary gain medium.

In some implementations of the apparatus, the voxel projector is a rotatable diffractive plate. A radial location of the light beam on the voxel projector and rotational orientation of the voxel projector control the relatively larger changes in the X and Y dimension of the expanded beam that is projected into the volume of the stationary gain medium.

In some implementations of the apparatus, the relatively larger changes in the X and Y dimension of the expanded beam that is projected into the volume of the stationary gain medium causes changes in the X and Y dimensions of sufficient size to speed up raster scanning of voxels to obtain a resolution of one thousand and twenty-four pixels over a thirty centimeter display area.

In some implementations of the apparatus, the apparatus further includes a variable focal length lens, located between the scanning mirror and the voxel projector, to adjust the light beam in a Z-direction into and out of the volume of the stationary gain medium.

In some implementations of the apparatus, the apparatus further includes two or more lenses, located between the scanning mirror and the voxel projector, to adjust the light beam in a Z-direction into and out of the volume of the stationary gain medium. The two or more lenses are stacked in the Z-direction and selectively actuated on a lens-by-lens basis to adjust the light beam in the Z-direction into and out of the volume of the stationary gain medium.

In some implementations of the apparatus, the apparatus further includes a lens and a bracket. The lens is located between the scanning mirror and the voxel projector, to adjust the light beam in a Z-direction into and out of the volume of the stationary gain medium, where the lens is positioned close enough to the spinnable diffractive plate to remove any possible angle of photons. The bracket is configured to maintain the placement of the lens with respect to the voxel projector to remove any possible angle of photons.

In some implementations of the apparatus, the 3D display is a static volumetric display.

In another embodiment, a system includes a vehicle and a 3D volumetric display coupled to the vehicle. The 3D volumetric display includes a transparent enclosed volume, a light source, a scanning mirror, and a voxel projector. The transparent enclosed volume holds a gas as a stationary gain medium. The scanning mirror is configured to direct a light beam from the light source in an X and a Y dimension. The voxel projector is configured to receive the light beam from the scanning mirror and project an expanded beam into the transparent enclosed volume of the stationary gain medium. A change in the orientation of the scanning mirror to direct the light beam from the light source covers a first area in the X and Y dimension of the transparent enclosed volume when not modified by the voxel projector and covers a second larger area in the X and Y dimension of the transparent enclosed volume when modified by the voxel projector.

In some implementations of the system, the voxel projector includes a grating structure, where an individual surface structure pattern within the grating structure is at a scale of between 1-10 microns.

In some implementations of the system, the voxel projector includes a metasurface structure, where an individual surface structure pattern within the metasurface structure is at a scale of between 100-900 nanometers.

In some implementations of the system, the voxel projector is stationary. Orientation changes by the scanning mirror control the relatively larger changes in the X and Y dimension of the expanded beam that is projected into the volume of the stationary gain medium.

In some implementations of the system, the voxel projector is a rotatable diffractive plate, where a radial location of the light beam on the voxel projector and rotational orientation of the voxel projector control the relatively larger changes in the X and Y dimension of the expanded beam that is projected into the volume of the stationary gain medium.

In some implementations of the system, the system further includes two or more lenses located between the scanning mirror and the voxel projector to adjust the light beam in a Z-direction into and out of the volume of the stationary gain medium, where the two or more lenses are stacked in the Z-direction and selectively actuated on a lens-by-lens basis to adjust the light beam in the Z-direction into and out of the volume of the stationary gain medium.

In another embodiment, a method for 3D volumetric displays includes holding a gas, via a transparent enclosed volume, as a stationary gain medium; emitting a light beam, via a light source; directing the light beam from the light source in an X and a Y dimension, via a scanning mirror; and receiving the light beam from the scanning mirror and projecting an expanded beam into the transparent enclosed volume of the stationary gain medium, via a voxel projector. A change in the orientation of the scanning mirror to direct the light beam from the light source covers a first area in the X and Y dimension of the transparent enclosed volume when not modified by the voxel projector and covers a second larger area in the X and Y dimension of the transparent enclosed volume when modified by the voxel projector.

In some implementations of the method, the voxel projector is stationary. Orientation changes by the scanning mirror control the relatively larger changes in the X and Y dimension of the expanded beam that is projected into the volume of the stationary gain medium.

In some implementations of the method, the voxel projector is a rotatable diffractive plate. A radial location of the light beam on the voxel projector and rotational orientation of the voxel projector control the relatively larger changes in the X and Y dimension of the expanded beam that is projected into the volume of the stationary gain medium.

In some implementations of the method, the method further includes two or more lenses, located between the scanning mirror and the voxel projector, to adjust the light beam in a Z-direction into and out of the volume of the stationary gain medium, where the two or more lenses are stacked in the Z-direction and selectively actuated on a lens-by-lens basis to adjust the light beam in the Z-direction into and out of the volume of the stationary gain medium.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

As described above, in the case of static volumetric displays, traditional raster scanning that has been demonstrated for cathode ray tubes is often utilized. However, such traditional raster scanning may be too slow to achieve the necessary large scale data accessing for 3D displays. For example, it may be too difficult to raster scan X and Y locations of a volume using existing techniques. For example, in order to get a display image for a static volumetric display (e.g., a static volumetric display that is approximately 0.5 m by 0.5 m by 0.5 m) that is on the order of the resolution of modern day flat screens, there is a need to illuminate a volume that includes approximately 1.25e17 pixels. This is a very large number of pixels that most available graphics processing units (GPU) may not be able to resolve. Accordingly, there is a need for techniques that can cover more of the volume of a 3D volumetric display.

As will be described in greater detail below, in some implementations disclosed herein, a voxel projector may be used to permit a scanning mirror to cover more of the volume of a 3D volumetric display.

In one implementation, a stationary grating structure-type voxel projector may be configured to manipulate the light beam by magnifying and/or projecting the light beam into a larger area in the volume. The grating structure may allow small changes in the X and/or Y dimensions by a scanning mirror to cause larger changes in the X and/or Y dimensions in the volume of the 3D volumetric display.

In another implementation, a stationary metasurface structure-type voxel projector may be configured to manipulate the light beam by magnifying and/or projecting the light beam into a larger area in the volume. The metasurface structure may allow small changes in the X and/or Y dimensions by a scanning mirror to cause larger changes in the X and/or Y dimensions in the volume of the 3D volumetric display.

A variable focal length lens may be used to adjust a light beam in a Z-direction (e.g., into and out of the volume). Alternatively, a plurality of lenses may be stacked in a Z-direction and selectively actuated until the light beam is projected at the proper depth within the volume of the 3D volumetric display.

Additionally or alternatively, a rotatable diffractive plate-type voxel projector may be rotated to shift a light beam in an X dimension within the volume of a 3D volumetric display. Further, the light beam may be adjusted in the Y dimension within the volume by moving the light beam radially on the diffractive plate-type voxel projector. In such an implementation, a lens may be moved in Z-direction and is placed before the diffractive plate to move the laser beam in the Z-direction within the volume. The variable focal length lens may be positioned close enough to the rotatable diffractive plate to remove any possible angle of photons. As such, a bracket may be used to maintain the placement of the lens. In such an implementation, a 3D image may be generated in the 3D volumetric display by a diffractive accessing of voxels in a plurality of parallel planes.

More specifically, methods and systems will be described below that may provide for technology to use beam expansion to increase the volume accessible when producing a 3D image in 3D volumetric displays.

Figure 1A:
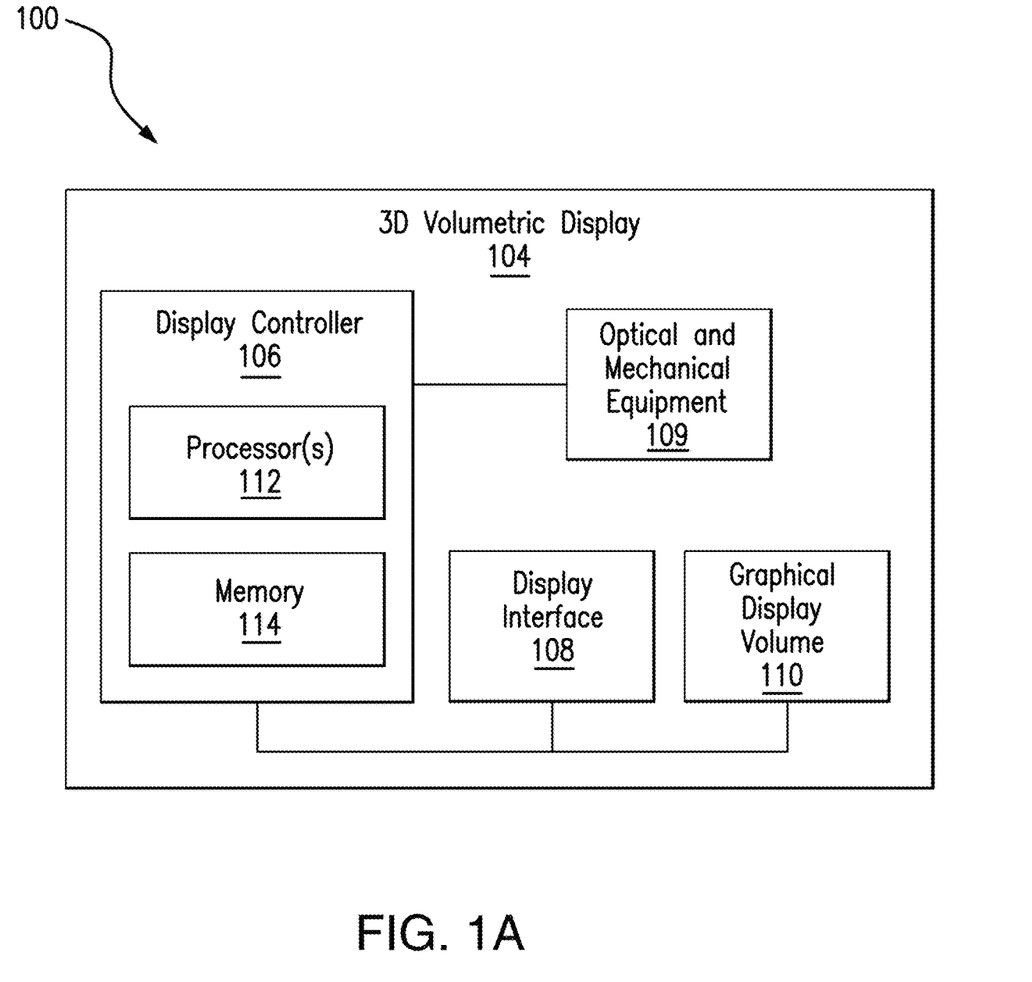
FIG. 1A is a block diagram of an example system of a 3D volumetric display according to an embodiment.

Turning now to FIG. 1A, a system 100 may include a 3D volumetric display 104. The 3D volumetric display 104 may include a display controller 106, a display interface 108, optical and mechanical equipment 109, and a graphical display volume 110. The 3D volumetric display 104 may be any type of handheld device, tabletop device, vehicle-installed device, or other form of single computing device, or may be composed of multiple computing devices (e.g., multiple computing devices linked in operative communication with one another).

In some implementations, the display controller 106 may be a processing system and may include a processor 112 coupled to a memory 114. The display controller 106 may also include a graphics processing unit (GPU) with enough bandwidth to accommodate rendering of 3D image and/or video data via the volumetric graphical display 110.

The processor 112 may include an embedded controller, a central processing unit (CPU), any other type of similar device or multiple devices capable of manipulating or processing information, and/or the like, for example. The memory 114 may include a non-volatile memory (NVM), a volatile memory, any other suitable type of storage device, and/or the like, for example. The memory 114 may contain a set of instructions, which when executed by the processor 112, cause the display controller 106 to present image information, such as 3D still images and/or 3D video, on the graphical display volume 110.

Such a presentation may be initiated in response to user input from display interface 108 to the display controller 106, for example. The display interface 108 may include one or more user interfaces (UI) to receive input from a user and function as a user point of human-computer interaction and communication. The display interface 108 may include a touch screen, keyboard, mouse, physical buttons, physical dials, a remote control, the like, and/or combinations thereof.

As will be described in greater detail below, the optical and mechanical equipment 109 may include one or more lasers, lenses, mirrors, motors, the like, and/or combinations thereof. For example, the optical and mechanical equipment 109 may include one or more devices for moving optics to focus and direct a laser.

The graphical display volume 110 may be configured to present a 3D volumetric image to a user. The graphical display volume 110 may be of any suitable shape and/or size. In some examples, the graphical display volume 110 may be of a cubic shape, a cuboid shape, or any suitable volumetric shape. For example, the graphical display volume 110 may be shaped to conform to a surface of the vehicle 102 (e.g., a surface in the interior cabin of the vehicle, such as a ceiling of the vehicle). In some implementations, the graphical display volume 110 may be a static volumetric display. In other implementations, the graphical display volume 110 may be replaced with a free space display, with no barrier between the 3D image and a user. As will be described in more detail below, in some implementations, the graphical display volume 110 may be free standing or may be shaped to conform to many surfaces (e.g., a ceiling of a room, a wall of a room, and/or a window, and/or the like).

Figure 1B:
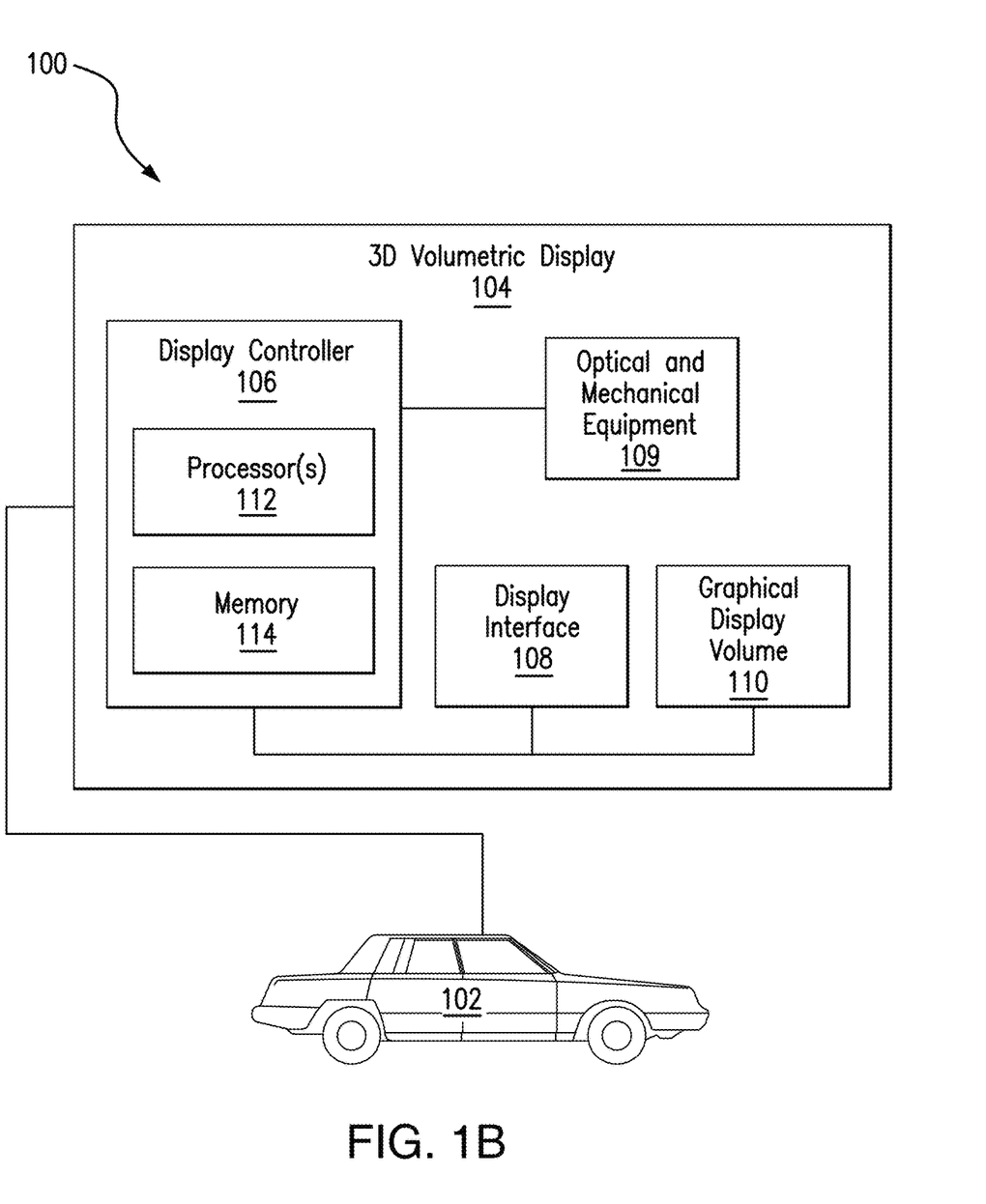
FIG. 1B is a block diagram of an example system of a vehicle installed 3D volumetric display according to an embodiment.

Turning now to FIG. 1B, the system 100 may include a vehicle 102. In such an example, the 3D volumetric display 104 may be coupled to the vehicle 102. In such an example, the 3D volumetric display 104 may be directly or indirectly paired with the vehicle 102. For example, the 3D volumetric display 104 may be associate with, coupled to, and/or operatively coupled to the vehicle 102. In one example, the 3D volumetric display 104 may be implemented physically outside of the vehicle 102, yet still function to present the 3D graphical image in the vehicle 102. Alternatively, as illustrated above with respect to FIG. 1, the 3D volumetric display 104 may be implemented as a free standing user-controlled remote device to bring about the 3D graphical image in the vehicle 102. Similarly, the volumetric graphical display 110 portion of the 3D volumetric display 104 may be implemented inside the vehicle 102, whereas the remaining features of the 3D volumetric display 104 may be located outside of the vehicle 102 in a user-controlled remote device. The vehicle 102 may be a personal vehicle such as a car, a taxi, a shuttle, a truck, a van, a sport utility vehicle/SUV, an aircraft, and/or the like, for example. The vehicle 102 may be a personal vehicle such as a car, a taxi, a shuttle, a truck, a van, a sport utility vehicle/SUV, an aircraft, and/or the like, for example. In some implementations, the volumetric graphical display 110 may be shaped to conform to a surface of the vehicle 102 (e.g., a surface in the interior cabin of the vehicle, such as a ceiling or a window of the vehicle).

While the illustrated example shows the 3D volumetric display 104 being coupled to the vehicle 102, it will be appreciated that the 3D volumetric display 104 could be implemented as a stand-alone device. For example, the 3D volumetric display 104 may be any type of handheld device, tabletop device, vehicle-installed device, or other form of single computing device, or may be composed of multiple computing devices.

For thin surfaces, such as the window of the vehicle 102, the glass may be encapsulated in a Dewar type glass if the gas pressure is near vacuum, for example. In such an implementation, a potential shape may be limited by Beer Lambert's law, with the absorption of the composed gas being the limiting thickness of the volume.

Figure 2:
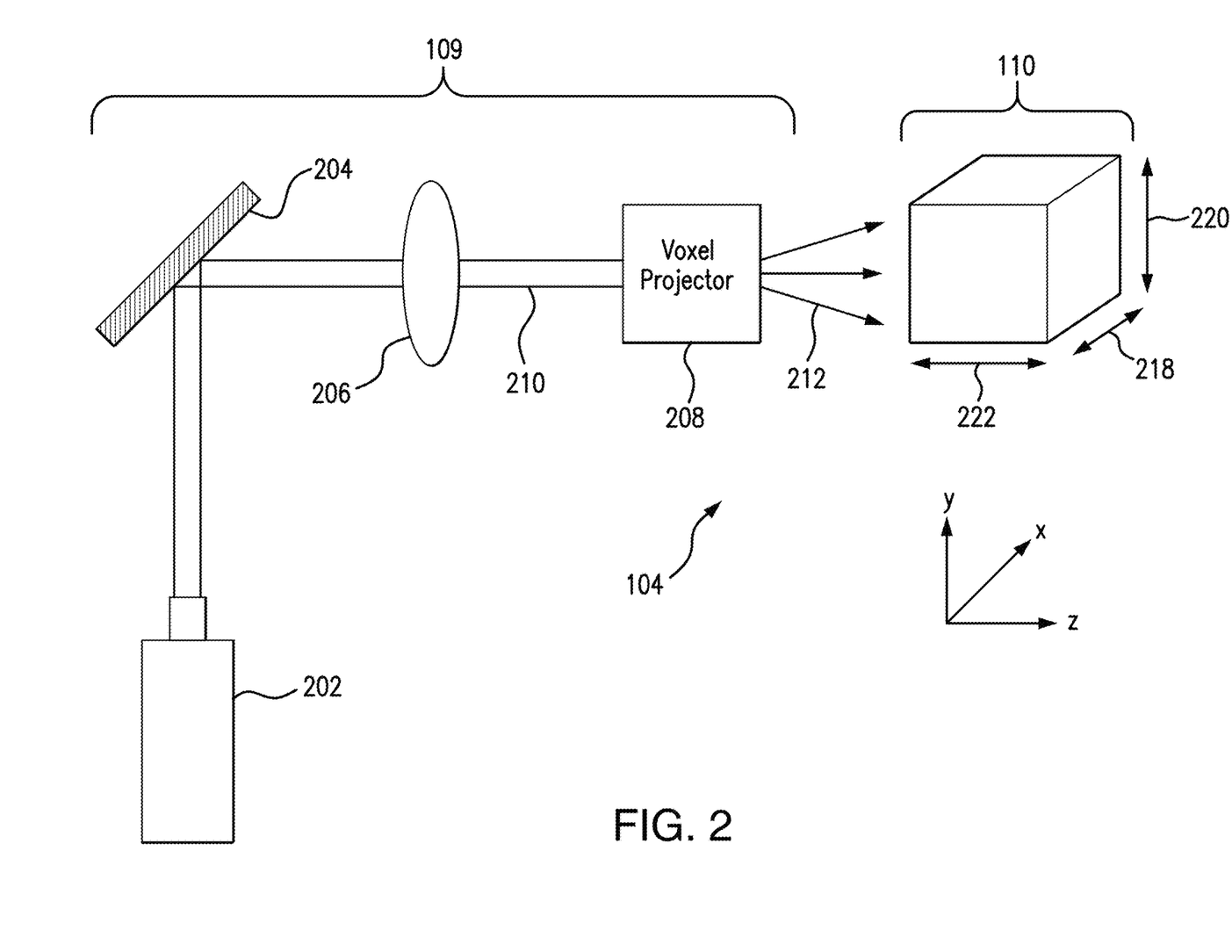
FIG. 2 is an illustrative diagram of an example 3D volumetric display according to an embodiment.

As illustrated in FIG. 2, the 3D volumetric display 104 may include the graphical display volume 110, illustrated here as a transparent enclosed volume, as well as the optical and mechanical equipment 109. In some implementations the transparent enclosed volume of graphical display volume 110 may hold a gas as a stationary gain medium. In one example, the gas may include a noble gasses, helium, and/or combinations thereof.

In the illustrated implementation, the 3D volumetric display 104 may include a light source 202. The light source may be 202 may be configured to emit a light beam 210. For example, light source 202 may be a laser configured to emit a pumped laser beam. In such an example, the pump laser may be tunable to a plurality of wavelengths. Different laser wavelengths may be used to create different wavelengths of illumination (e.g., red, green, yellow, and blue, as well as other colors). For example, different pumping wavelengths may be used to create different wavelengths of illumination (e.g., red, green, yellow, and blue, as well as other colors) visible to a user as a result of luminescence, although other luminescence mechanisms may be utilized with the 3D volumetric display 104 disclosed herein. For example, such luminescence may be achieve by two-photon excitation. In one example, light source 202 may include a femtosecond laser to pump the gain medium and cause luminescence.

In some examples, the 3D volumetric display 104 may include a scanning mirror 204. The scanning mirror 204 may be configured to direct the light beam 210 from the light source 202. For example, a motor may be used to control the positioning of the scanning mirror 204 to adjust the light beam 210 in the X and/or Y dimensions, e.g., in a horizontal dimension 218 and/or vertical dimension 220 with respect to a voxel projector 208, as will be described in more detail below.

In some examples, the 3D volumetric display 104 may include a lens 206. The lens 206 may be located between the scanning mirror 204 and the voxel projector 208. The lens 206 may be configured to focus the light beam 210 to a tightly focused spot. In some implementations, lens 206 may be a variable focal length lens located between the scanning mirror 204 and the voxel projector 208 to adjust the light beam 210, and thus expanded beam 212, in a Z-direction, e.g., in a longitudinal dimension 222 into and out of the stationary gain medium within the graphical display volume 110. For example, a motor the rotational stage of the lens 206 may be controlled to adjust the light beam 210 in the Z-direction via a polymer and electrical actuator, a motor, the like, and/or combinations thereof.

Alternatively, lens 206 may include two or more lenses configured to adjust the light beam 210 in the Z-direction. For example, the two or more lenses may be stacked in the Z-direction and selectively actuated on a lens-by-lens basis to adjust the light beam 210 in the Z-direction, e.g., into and out of the stationary gain medium within the graphical display volume 110.

In the illustrated implementation, the 3D volumetric display 104 may include a voxel projector 208. The voxel projector may be configured to receive the light beam 210 from the scanning mirror 204 and may be configured to project an expanded beam 212 into the stationary gain medium within the graphical display volume 110.

The expanded beam may be expanded in an X and/or Y dimension, e.g., in a horizontal and/or vertical dimension. For example, changes in the X and/or Y orientation between the light beam 210 from the scanning mirror 204 and the voxel projector 208 may result in relatively larger changes in the X and Y dimension of the expanded beam 210 that is projected into the stationary gain medium within the graphical display volume 110 to produce a 3D image. Accordingly, a change in the orientation of the scanning mirror 204 to direct the light beam 210 from the light source 202 covers a first area in the X and Y dimension of the graphical display volume 110 when not modified by the voxel projector 210 and covers a second larger area in the X and Y dimension of the graphical display volume 110 when modified by the voxel projector 210.

As will be discussed in more detail below, the voxel projector 208 may be used to permit the scanning mirror 204 to cover more of the volume of the 3D volumetric display 104 through several different implementations disclosed herein.

In one implementation, a stationary grating structure-type voxel projector 208 may be configured to manipulate the light beam 210 by magnifying and/or projecting the light beam 210 into a larger area in the volume of the 3D volumetric display 104. The stationary grating structure-type voxel projector 208 may allow small changes in the X and/or Y dimensions by the scanning mirror 204 to cause larger changes in the X and/or Y dimensions in the volume of the 3D volumetric display 104.

In another implementation, a stationary metasurface structure-type voxel projector 208 may be configured to manipulate the light beam 210 by magnifying and/or projecting the light beam 210 into a larger area in the volume of the 3D volumetric display 104. The stationary metasurface structure-type voxel projector 208 may allow small changes in the X and/or Y dimensions by the scanning mirror 204 to cause larger changes in the X and/or Y dimensions in the volume of the 3D volumetric display 104.

In a further implementation, a rotatable diffractive plate-type voxel projector 208 may be rotated to shift the light beam 210 in an X dimension within the volume of the 3D volumetric display 104. Then the light beam may be adjusted in the Y dimension within the volume by moving the light beam radially on the diffractive plate-type voxel projector. The rotatable diffractive plate-type voxel projector 208 may allow small changes in the X and/or Y dimensions in the rotational and radial position to cause larger changes in the X and/or Y dimensions in the volume of the 3D volumetric display 104.

Figure 3A:
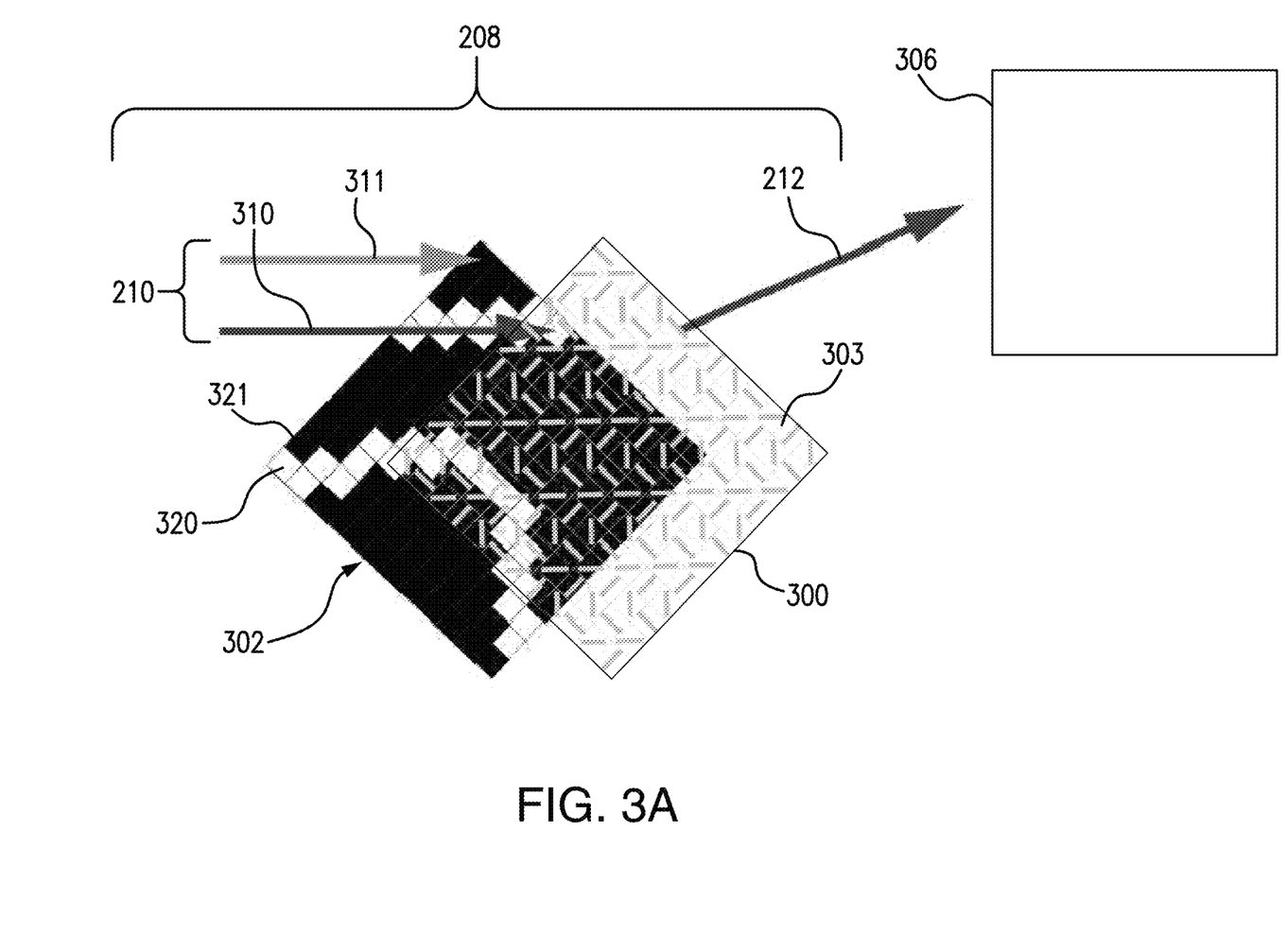
FIG. 3A is an illustrative diagram of a stationary grating structure according to an embodiment.

As illustrated in FIG. 3A, the voxel projector 208 may be implemented as a grating structure 300. The grating structure 300 may permit the expanded beam 212 to cover more of the volume of a slice 306 of a 3D image. For example, the scaling of the image from a smaller planar dimension to a larger planar dimension increases the dimension of the accessible beam region of slice 306.

In such an implementation, grating structure 300 may be used in combination with a liquid crystal 302. The role of the grating structure 300 is to increase the dimension of the accessible beam region of slice 306. The role of the liquid crystal 302 is to choose which pixel should be illuminated. For example, liquid crystal 302 allows an optical beam portion 310 to pass through a clear portion 320 of liquid crystal 302. Likewise, liquid crystal 302 blocks an optical beam portion 311 from passing through a darkened portion 321 of liquid crystal 302.

In the illustrated implementation, the voxel projector 208 implemented as the grating structure 300 may be stationary. Accordingly, orientation changes by the scanning mirror (e.g., see FIG. 2) may control the relatively larger changes in the X and Y dimension of the expanded beam 212 that is projected into the volume of the stationary gain medium.

The grating structure 300 may include a surface structure pattern 303. An individual part of the surface structure pattern 303 may be at a scale larger than a wavelength of the light beam. Such a grating structure 300 may be a Dammann-type grating, or the like.

As used herein the term "grating" may refer to indents in a plane, where the indents correspond to specific angles of refraction based on wavelength of light incident on the indents (e.g., as individual part of the surface structure pattern 303). For example, the indents in such a grating are at a scale larger than the wavelength of light. In some examples, the suitable size of the indents in such a grating may be dependent on the wavelength of light utilized. In an example where the light used has a one micron wavelength, the indents in such a grating may be larger than one micron, and/or a similar size, for example (e.g., an individual surface structure pattern within the grating structure may be at a micron scale of between 1-10 microns). Typically, gratings may provide diffracted of light expansion access mostly limited to an expansion in one dimension, e.g., horizontal or vertical.

In operation, a plurality of voxel projectors 208 implemented as grating structures 300 may be utilized. For example, for red-green-blue-type systems, a single red optical beam may be associated with a first grating structure 300, a single blue optical beam may be associated with a second grating structure 300, and a single blue optical beam may be associated with a third grating structures 300.

Figure 3B:
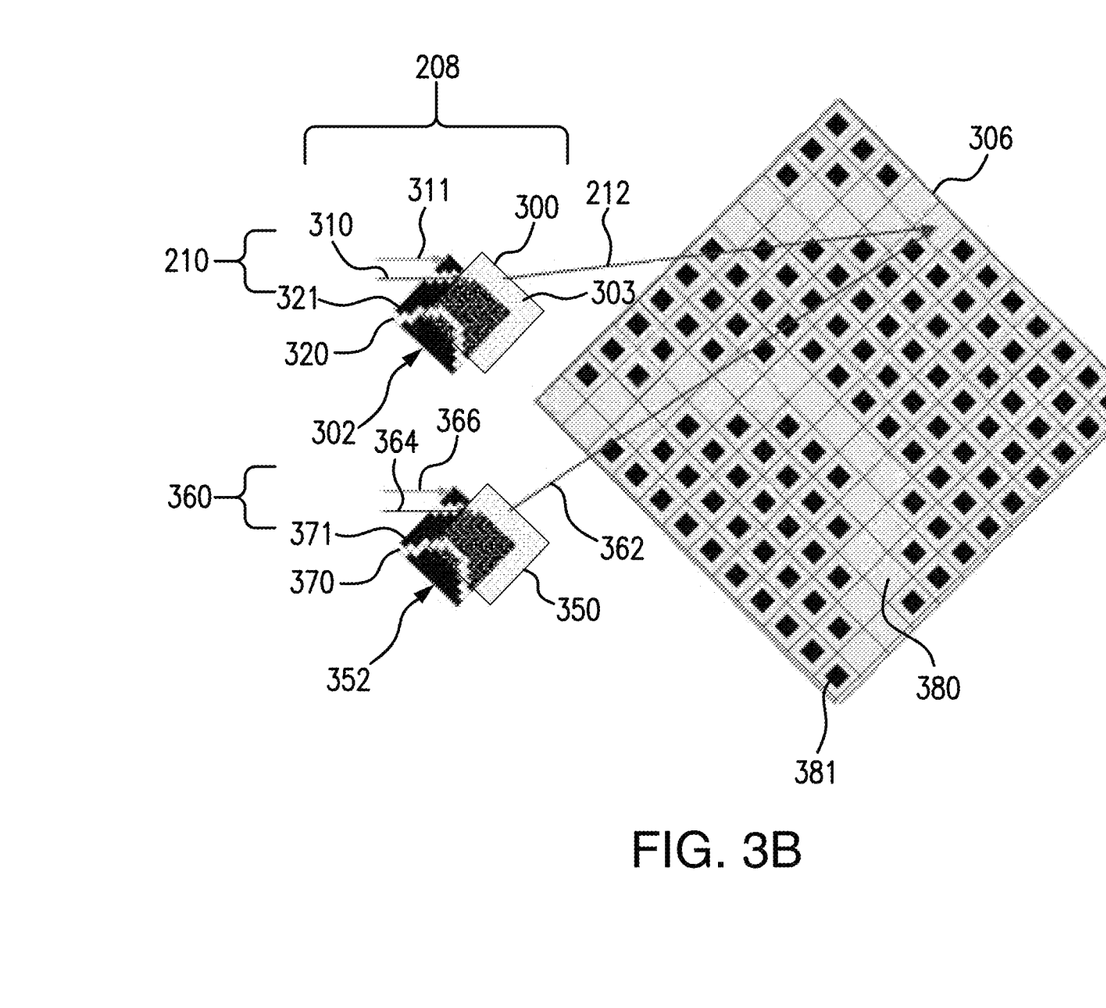
FIG. 3B is another illustrative diagram of a stationary grating structure according to an embodiment.

As illustrated in FIG. 3B, another illustrative diagram of a stationary grating structure 300 according to an embodiment the voxel projector 208 may be implemented to accommodate two optical beams being used in conjunction. For example, two optical beams may be used in conjunction to generate two-photon luminescence to illuminate a given voxel in 3D space. In such an implementation, each pair of optical beams may be associated with a corresponding pair of grating structures 300.

For example, a first optical beam 210 may be associated with a first grating structure 300 and a second optical beam 360 may be associated with a second grating structure 350. The grating structures 300 and 350 may permit the expanded beam 212 and 362 to cover more of the volume of a slice 306 of a 3D image.

In such an implementation, second grating structure 350 may be used in combination with a second liquid crystal 352. The role of the second grating structure 350 is to increase the dimension of the accessible beam region of slice 306. The role of the second liquid crystal 352 is to choose which pixel should be illuminated. For example, the second liquid crystal 352 allows an optical beam portion 366 to pass through a clear portion 370 of the second liquid crystal 352. Likewise, the second liquid crystal 352 blocks an optical beam portion 366 from passing through a darkened portion 321 of the second liquid crystal 352. For example, the expanded beams 212 and 362 may illuminate voxel pattern 380 while darkening voxel pattern 381.

Figure 4:
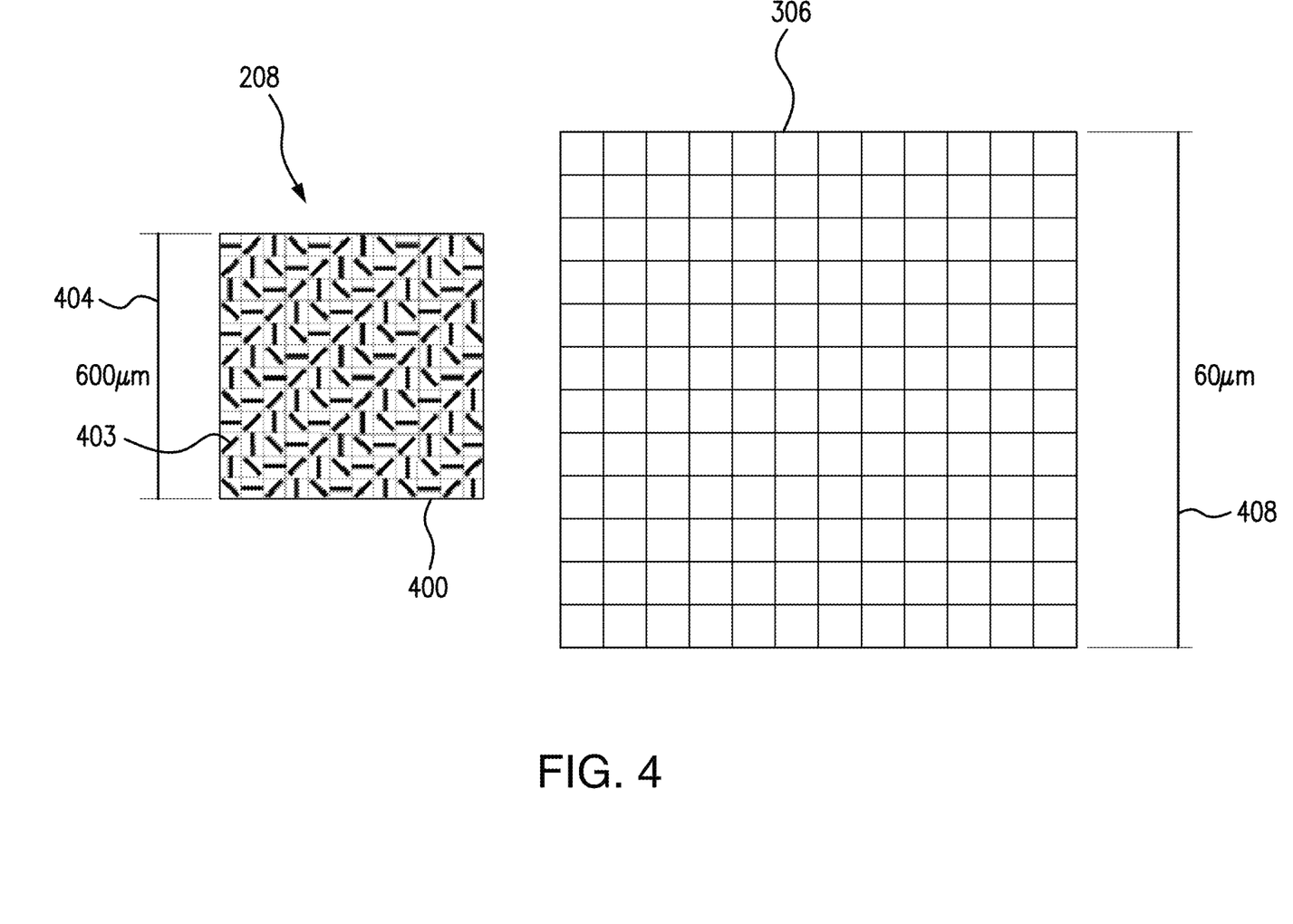
FIG. 4 is an illustrative diagram of a stationary metasurface structure according to an embodiment.

As illustrated in FIG. 4, the voxel projector 208 may be implemented as a metasurface structure 400. The metasurface structure 300 may permit the expanded beam to cover more of the volume of a slice of a 3D image.

For example, such a metasurface structure 400 may include a surface structure pattern 403. An individual part of the surface structure pattern 403 within the metasurface structure 400 may be at a scale smaller than a wavelength of the light beam.

As used herein the term "metasurface" may refer to microscopic surface structure pattern in a plane, where the microscopic surface structures correspond to specific angles of refraction based on wavelength of light incident on the microscopic surface structures (e.g., as an individual part of the surface structure pattern 403). For example, the microscopic surface structures in such a metasurface may be at a scale smaller than the wavelength of light. In some examples, the suitable size of the microscopic surface structures in such a metasurface may be dependent on the wavelength of light utilized. In an example where the light used has a one micron wavelength, the microscopic surface structures in such a metasurface may be at a nanoscale, e.g., smaller than one micron, such as three hundred nanometers, two hundred nanometers, and/or a similar size, for example (e.g., an individual surface structure pattern within the metasurface structure is at a scale of between 100-900 nanometers).

FIG. 4 illustrates the relative aspect ratio of the accessible region 306 in 2D space as compared to the overall 2D space of the metasurface structure 400. In the illustrated example, a metasurface of 600 nanometers (e.g., as illustrated at item 404) may increases the dimension of the accessible beam region of slice 306 to 60 microns (e.g., as illustrated at item 408). Typically, metasurfaces may provide diffracted of light expansion access to an expansion in two dimensions, e.g., horizontal and vertical, and provide control over the light's phase and amplitude.

Additionally, even though an optical beam may illuminate a small voxel region, the visibly effective pixel size can be larger. For example, the effective pixel size will vary depending on the radiative pattern of the emissive material. For more emissive materials, a given illuminated voxel region may result in a larger visibly effective pixel size, as compared to operations with a less emissive material.

In some implementations, the voxel projector 208 implemented as the metasurface structure 400 may be stationary. Accordingly, orientation changes by the scanning mirror (e.g., see FIG. 2) may control the relatively larger changes in the X and Y dimension of the expanded beam (e.g., see FIG. 2) that is projected into the volume of the stationary gain medium.

In operation, a plurality of voxel projectors 208 implemented as metasurface structures 400 may be utilized. For example, for red-green-blue-type systems, a single red optical beam may be associated with a first metasurface structure 400, a single blue optical beam may be associated with a second metasurface structure 400, and a single blue optical beam may be associated with a third metasurface structure 400.

Alternatively, as discussed above, some systems may utilize pairs of optical beams in conjunction to generate two-photon luminescence to illuminate a given voxel in 3D space. In such an implementation, each pair of optical beams may be associated with a corresponding pair of metasurface structures 400.

Figure 5:
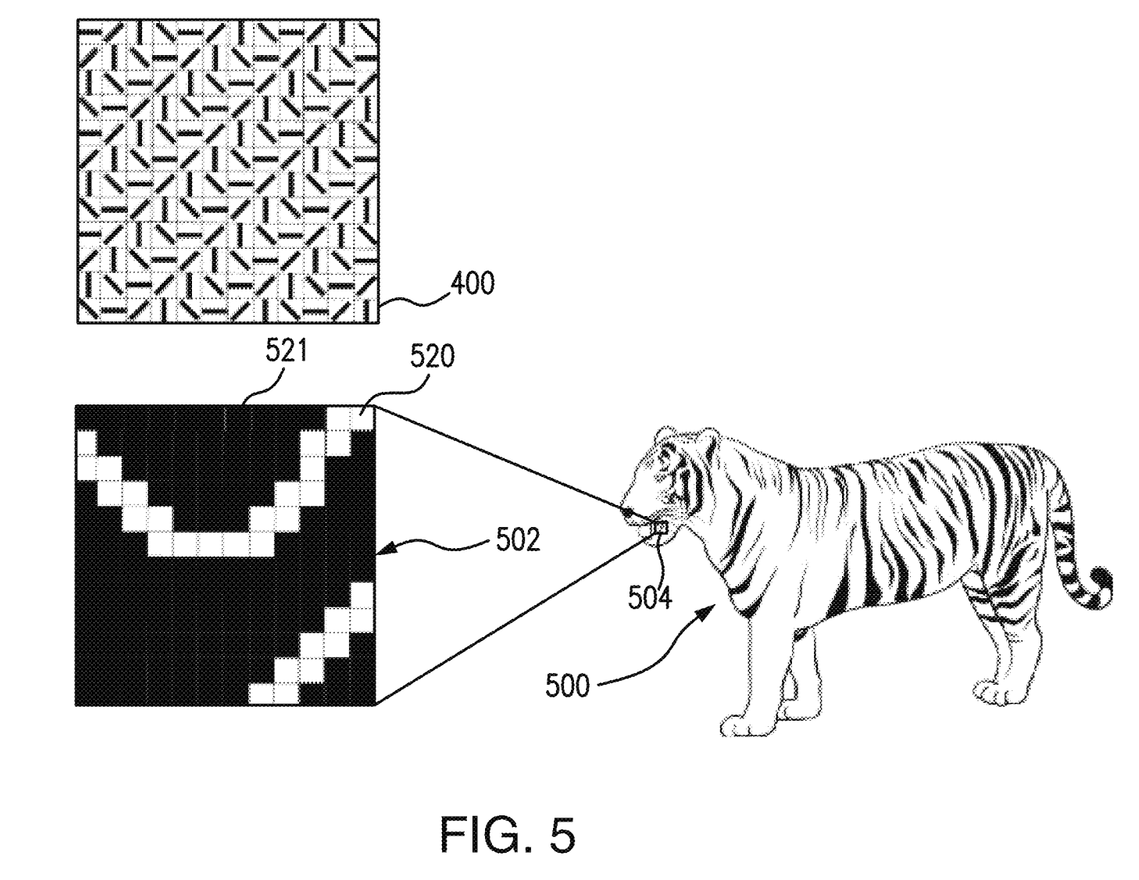
FIG. 5 is another illustrative diagram of another example stationary metasurface structure according to an embodiment.

As illustrated in FIG. 5 metasurface structure 400 may be utilized in a manner similar to grating structure 300 to generate an image 500. In the illustrated example, a liquid crystal back plane 502 may modify the region of illuminated-interest. In such an implementation, metasurface structure 400 may be used in combination with liquid crystal back plane 502. The role of the metasurface structure 400 is to increase the dimension of the accessible beam region of a slice of image 500. The role of the liquid crystal back plane 502 is to choose which pixel should be illuminated within image portion 504. For example, liquid crystal back plane 502 allows an optical beam to pass through a clear portion 520 of liquid crystal back plane 502. Likewise, liquid crystal 502 blocks an optical beam from passing through a darkened portion 521 of liquid crystal back plane 502.

Figure 6:
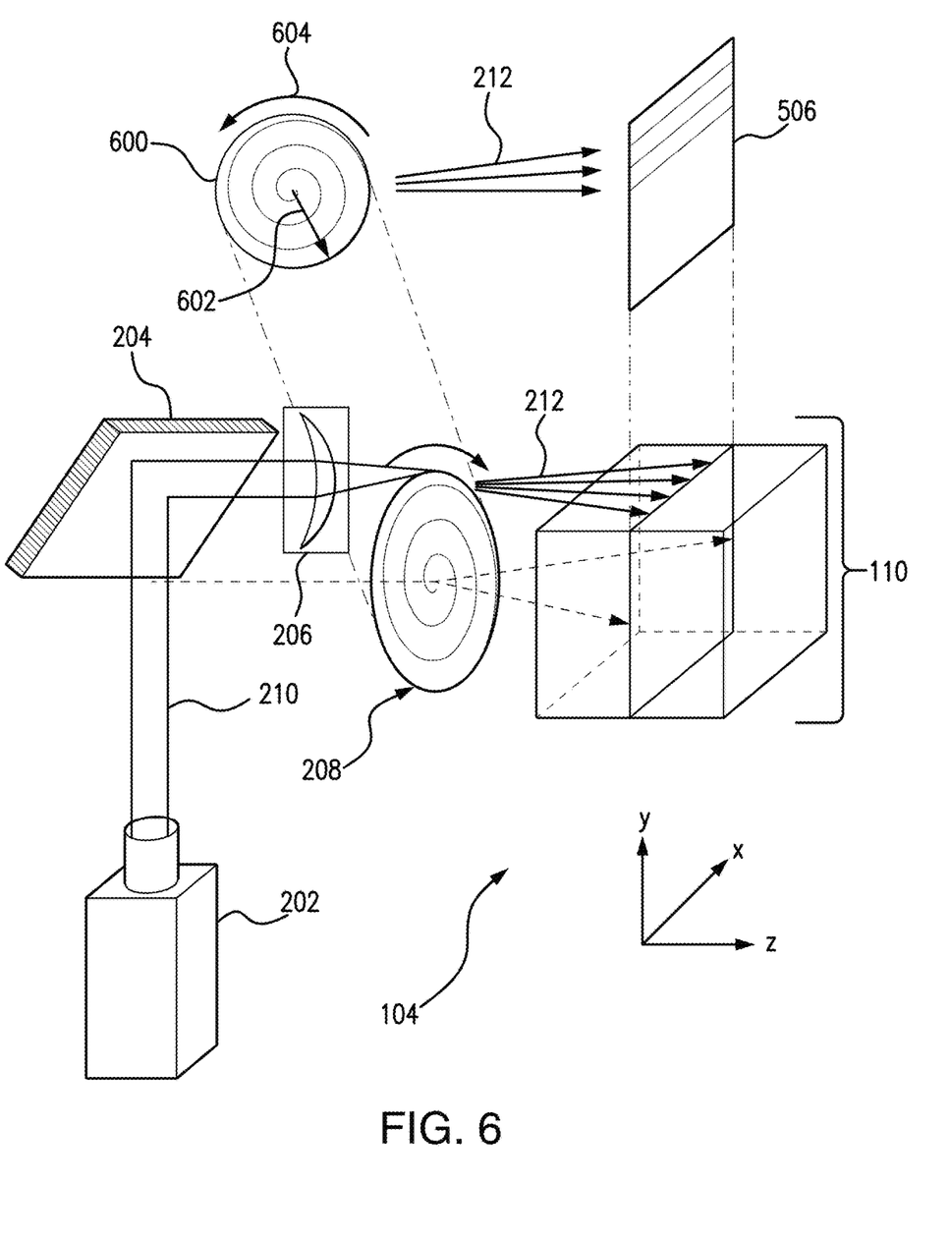
FIG. 6 is an illustrative diagram of another example 3D volumetric display in operation with a rotatable diffractive plate according to an exemplary embodiment.

As illustrated in FIG. 6, the voxel projector 208 may be a rotatable diffractive plate 600. For example, a radial location 602 of the light beam 208 on the rotatable diffractive plate 600 and rotational orientation 604 of the rotatable diffractive plate 600 may be used to control the relatively larger changes in the X and Y dimension of the expanded beam that is projected into the volume of the stationary gain medium. The rotatable diffractive plate 600 may permit the expanded beam 212 to cover more of the volume of a slice 606 of a 3D image.

In such an implementation, specific locations on the rotatable diffractive plate 600 will correspond to specific locations on an XY coordinate plane. For example, a series of these specific locations may be oriented as a spiral, or similar functional orientation, on the rotatable diffractive plate 600. These specific locations on the rotatable diffractive plate 600 may be similar to memory on a Compact Disc (CD). Accordingly, the resolution of the coordinate plane may be defined by the specific locations on the rotatable diffractive plate 600, e.g., by the "memory" of the disc.

Advantageously, the relatively larger changes in the X and Y dimension of the expanded beam 212 that is projected into the volume of the stationary gain medium causes changes in the X and Y dimensions of sufficient size to speed up raster scanning of voxels to obtain a resolution of one thousand and twenty-four pixels over a thirty centimeter display area. Similar results may be obtainable from the implementations illustrated in FIGS. 3A-5.

Figure 7:
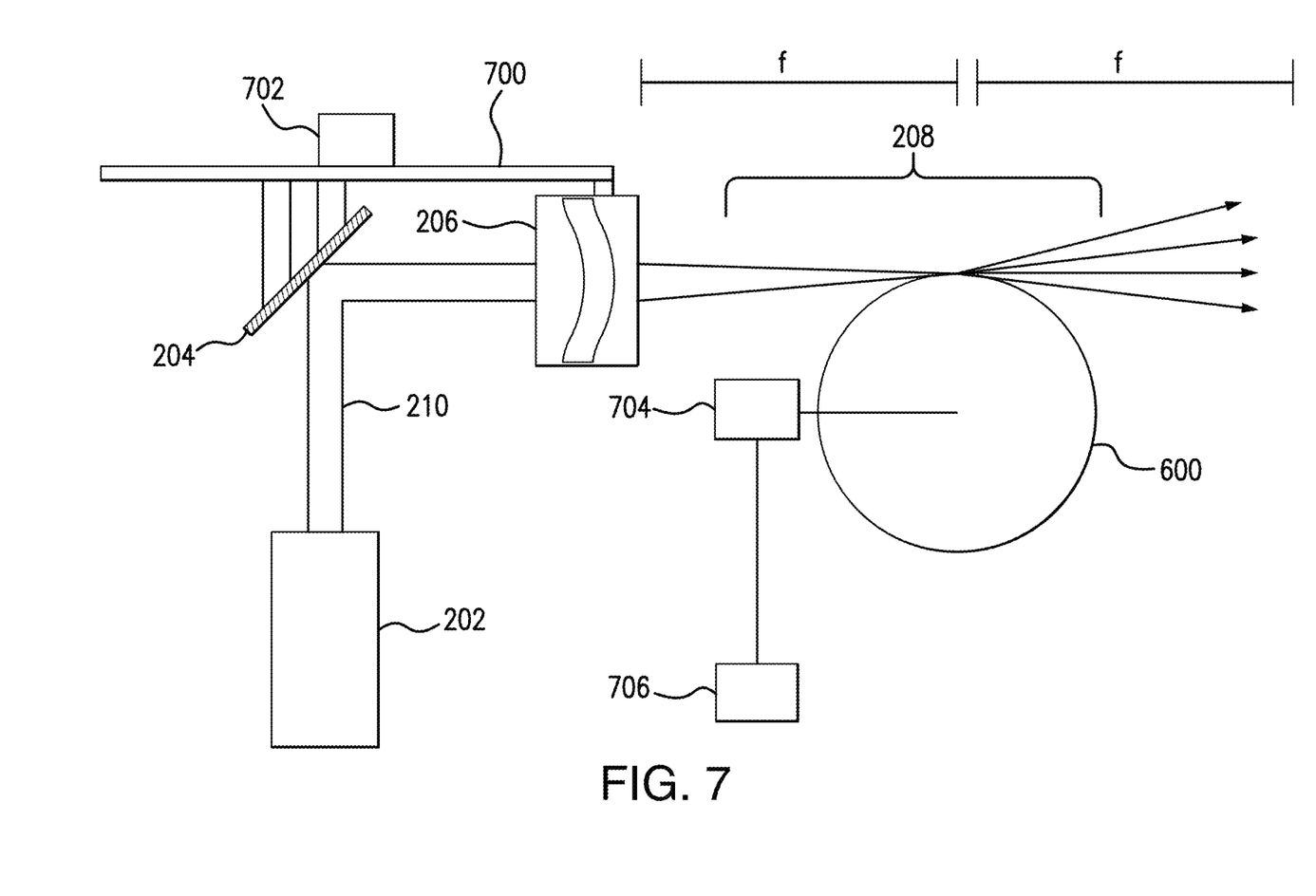
FIG. 7 is another illustrative diagram of an example bracket for a 3D volumetric display according to an exemplary embodiment.

As illustrated in FIG. 7, the lens 206 may be positioned close enough to the spinnable diffractive plate 600 to remove any possible angle of photons. In such an implementation, a bracket 700 may be coupled to the lens 206 and scanning mirror 204. The bracket 700 may be configured to maintain the placement of the lens 206 with respect to the spinnable diffractive plate 600 to remove any possible angle of photons.

A first motor 702 may be operatively associated with the mirror 204 and variable focal length lens 206. For example, the first motor 702 may be attached to the mirror 204 and variable focal length lens 206 via the bracket 700 to control the placement of the lens 206 with respect to the spinnable diffractive plate 600.

A second motor 704 may be operatively associated with the spinnable diffractive plate 600. The second motor 704 may control the spin of the spinnable diffractive plate 600.

A third motor 706 may be operatively associated with the spinnable diffractive plate 600. The second motor 704 may control movement the linear movement of the spinnable diffractive plate 600.

As with some of the other implementations described herein, a plurality of the voxel projectors 208 with rotatable diffractive plates 600 could be used at the same time in a single 3D volumetric display.

Figure 8:
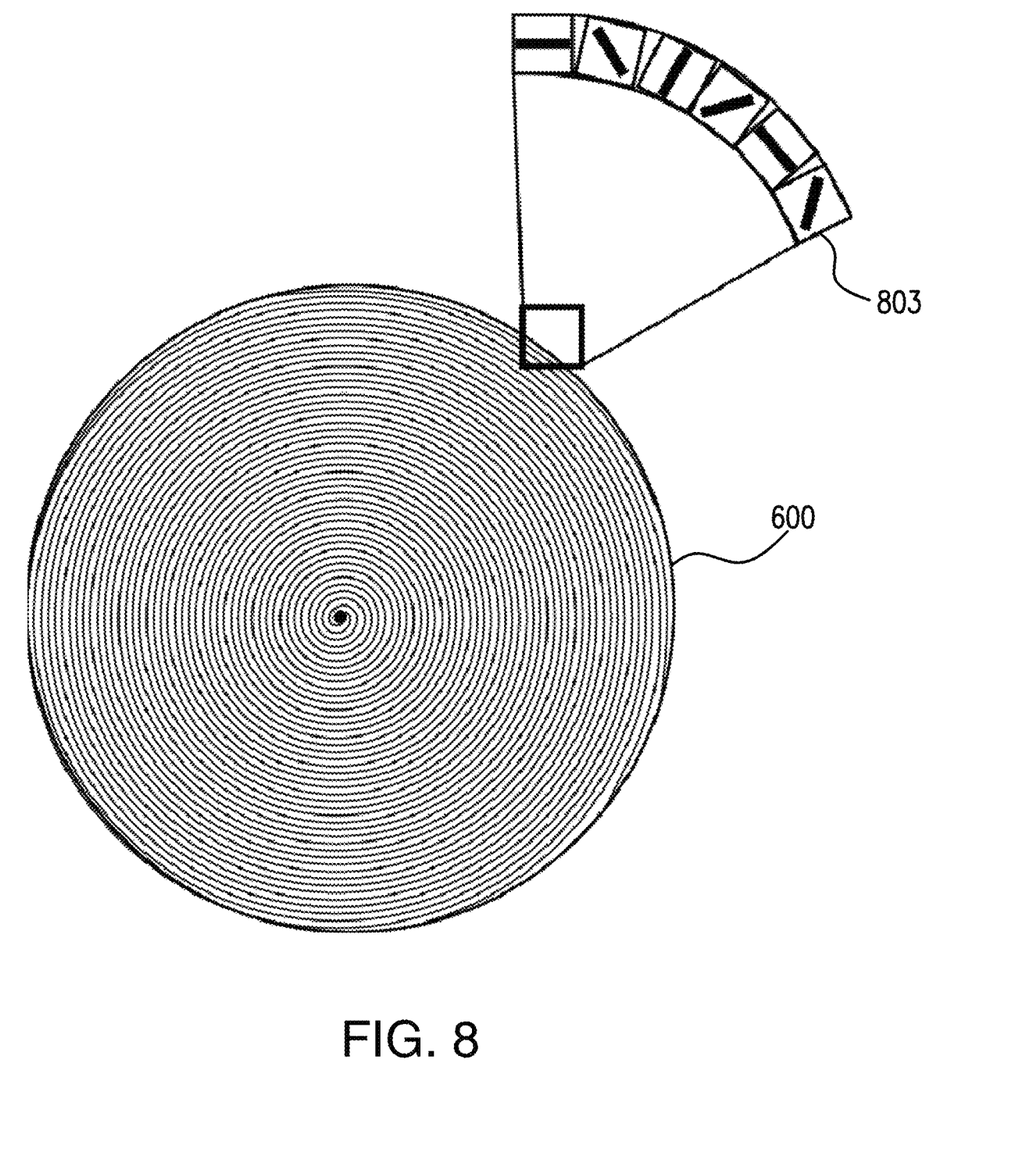
FIG. 8 is an illustrative diagram of rotatable diffractive plate in operation according to an exemplary embodiment.

As illustrated in FIG. 8, the rotatable diffractive plate 600 may include a surface structure pattern 803. As discussed above, the specific locations on the rotatable diffractive plate 600 may be similar to memory on a Compact Disc (CD). Accordingly, the resolution of the coordinate plane may be defined by the specific locations on the rotatable diffractive plate 600, and the associated specific surface structure pattern 803 that is being accessed (e.g., by the "memory" of the disc). In such an implementation, the speed of the rotatable diffractive plate 600 allows for rapid diffraction of the system. In such an example, modulation of the optical beam would be reliant on the beam rather than on the liquid crystal implementations described with respect to FIGS. 3A-5.

Figure 9:
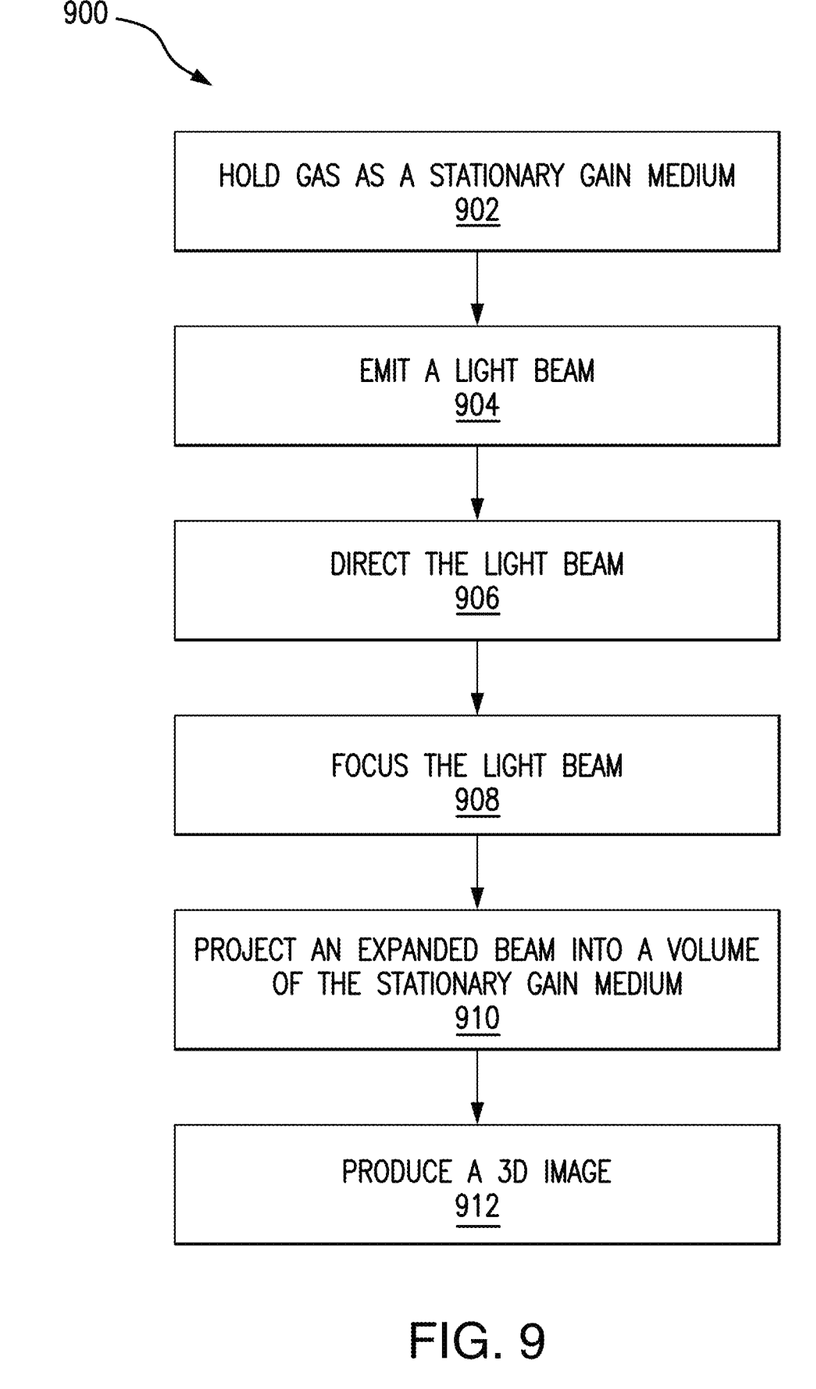
FIG. 9 is a flowchart of an example of a method of operating a 3D volumetric display according to an embodiment.

FIG. 9 shows a method 900 of operating the 3D volumetric display 104. In an embodiment, the method 900 may be implemented in logic instructions (e.g., software), configurable logic, fixed-functionality hardware logic, etc., or any combination thereof. While certain portions of 3D volumetric display 104 are illustrated in method 900, other portions of 3D volumetric display 104 from FIG. 1 have been intentionally left out to simplify the explanation of the method.

At illustrated processing operation 902, a gas may be held as a stationary gain medium. For example, a gas may be held as a stationary gain medium within a transparent enclosed volume.

At illustrated processing operation 904, a light beam may be emitted. For example, a light beam may be emitted, via a light source.

At illustrated processing operation 906, the light beam may be directed. For example, the light beam may be directed from the light source, via a scanning mirror.

At illustrated processing operation 908, the light beam may be focused. For example, the light beam may be focused, via a lens.

At illustrated processing operation 910, an expanded beam may be projected into a volume of the stationary gain medium. For example, an expanded beam may be projected into a volume of the stationary gain medium.

At illustrated processing operation 912, a 3D image may be produced. For example, the expanded beam may be moved to produce a 3D image. Display information may be passed to the light source, in the appropriate infrared wavelength, to give the desired corresponding red, green, blue (RGB) values to produce a 3D image.

In operation, changes in the X and Y orientation between the light beam from the scanning mirror and the voxel projector may result in relatively larger changes in the X and Y dimension of the expanded beam that is projected into the volume of the stationary gain medium to produce a 3D image.

In some implementations, the voxel projector may be stationary. In such an implementation, orientation changes by the scanning mirror may be used to control the relatively larger changes in the X and Y dimension of the expanded beam that is projected into the volume of the stationary gain medium.

In other implementations, the voxel projector may be a rotatable diffractive plate. In such an implementation, a radial location of the light beam on the voxel projector and rotational orientation of the voxel projector may be used to control the relatively larger changes in the X and Y dimension of the expanded beam that is projected into the volume of the stationary gain medium.

In some implementations, a variable focal length lens located between the scanning mirror and the voxel projector may adjust the light beam in a Z-direction into and out of the volume of the stationary gain medium.

In other implementations, two or more lenses located between the scanning mirror and the voxel projector may adjust the light beam in a Z-direction into and out of the volume of the stationary gain medium. In such an example, the two or more lenses may be stacked in the Z-direction and selectively actuated on a lens-by-lens basis to adjust the light beam in the Z-direction into and out of the volume of the stationary gain medium.

Advantageously, in some implementations disclosed herein, raster scanning voxels may be sped up in response to the beam expansion. For example, raster scanning voxels may be sped up in response to the beam expansion to obtain a resolution of one thousand pixels over a thirty centimeter display area.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. The term "coupled" may be used herein to refer to any type of relationship, direct or indirect, between the components in question, and may apply to electrical, mechanical, fluid, optical, electromagnetic, electromechanical or other connections. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components. In addition, the terms "first", "second", etc. may be used herein only to facilitate discussion, and carry no particular temporal or chronological significance unless otherwise indicated.

As used herein, the term "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. An apparatus for 3D volumetric display, comprising:
    a transparent enclosed volume, wherein the transparent enclosed volume holds a gas as a stationary gain medium;
    a light source;
    a scanning mirror configured to direct a light beam from the light source in an X and a Y dimension; and
    a voxel projector configured to receive the light beam from the scanning mirror and project an expanded beam into the transparent enclosed volume of the stationary gain medium, wherein the voxel projector is a rotatable diffractive plate, and wherein a change in a radial location of the light beam on the voxel projector controls changes in the Y dimension of the expanded beam that is projected into the volume of the stationary gain medium.

2. The apparatus of claim 1, wherein the voxel projector comprises a grating structure, wherein an individual surface structure pattern within the grating structure is at a scale of between 1-10 microns.

3. The apparatus of claim 1, wherein the voxel projector comprises a metasurface structure, wherein an individual surface structure pattern within the metasurface structure is at a scale of between 100-900 nanometers.

4. The apparatus of claim 1, wherein a rotational orientation of the voxel projector controls changes in the X dimension of the expanded beam that is projected into the volume of the stationary gain medium.

5. The apparatus of claim 4, wherein the voxel projector is stationary, and wherein orientation changes by the scanning mirror control changes in the X and Y dimension of the expanded beam that is projected into the volume of the stationary gain medium.

6. The apparatus of claim 4, wherein changes in the X and Y dimension of the expanded beam that is projected into the volume of the stationary gain medium causes changes in the X and Y dimensions to speed up raster scanning of voxels to obtain a resolution of one thousand and twenty-four pixels over a thirty centimeter display area.

7. The apparatus of claim 1, further comprising a variable focal length lens, located between the scanning mirror and the voxel projector, to adjust the light beam in a Z-direction into and out of the volume of the stationary gain medium.

8. The apparatus of claim 1, further comprising two or more lenses, located between the scanning mirror and the voxel projector, to adjust the light beam in a Z-direction into and out of the volume of the stationary gain medium, wherein the two or more lenses are stacked in the Z-direction and selectively actuated on a lens-by-lens basis to adjust the light beam in the Z-direction into and out of the volume of the stationary gain medium.

9. The apparatus of claim 1, further comprising:
    a lens, located between the scanning mirror and the voxel projector, to adjust the light beam in a Z-direction into and out of the volume of the stationary gain medium, wherein the lens is positioned proximate to the rotatable diffractive plate; and
    a bracket configured to maintain the placement of the lens with respect to the voxel projector to remove any possible angle of photons.

10. The apparatus of claim 1, wherein the 3D display is a static volumetric display.

11. A system, comprising:
    a vehicle;
    a 3D volumetric display coupled to the vehicle, the 3D volumetric display comprising:
        a transparent enclosed volume, wherein the transparent enclosed volume holds a gas as a stationary gain medium;
        a light source;
        a scanning mirror configured to direct a light beam from the light source in an X and a Y dimension; and
        a voxel projector configured to receive the light beam from the scanning mirror and project an expanded beam into the transparent enclosed volume of the stationary gain medium, wherein the voxel projector is a rotatable diffractive plate, and wherein a change in a radial location of the light beam on the voxel projector controls changes in the Y dimension of the expanded beam that is projected into the volume of the stationary gain medium.

12. The system of claim 11, wherein the voxel projector comprises a grating structure, wherein an individual surface structure pattern within the grating structure is at a scale of between 1-10 microns.

13. The system of claim 11, wherein the voxel projector comprises a metasurface structure, wherein an individual surface structure pattern within the metasurface structure is at a scale of between 100-900 nanometers.

14. The system of claim 11, wherein a rotational orientation of the voxel projector controls changes in the X dimension of the expanded beam that is projected into the volume of the stationary gain medium.

15. The apparatus of claim 14, wherein the voxel projector is stationary, and wherein orientation changes by the scanning mirror control changes in the X and Y dimension of the expanded beam that is projected into the volume of the stationary gain medium.

16. The system of claim 11, further comprising two or more lenses located between the scanning mirror and the voxel projector to adjust the light beam in a Z-direction into and out of the volume of the stationary gain medium, wherein the two or more lenses are stacked in the Z-direction and selectively actuated on a lens-by-lens basis to adjust the light beam in the Z-direction into and out of the volume of the stationary gain medium.

17. A method for 3D volumetric displays, comprising:
holding a gas, via a transparent enclosed volume, as a stationary gain medium;
emitting a light beam, via a light source;
directing the light beam from the light source in an X and a Y dimension, via a scanning mirror; and
receiving the light beam from the scanning mirror and projecting an expanded beam into the transparent enclosed volume of the stationary gain medium, via a voxel projector, wherein the voxel projector is a rotatable diffractive plate, and wherein a change in a radial location of the light beam on the voxel projector controls changes in the Y dimension of the expanded beam that is projected into the volume of the stationary gain medium.

18. The method of claim 17, wherein a rotational orientation of the voxel projector controls the relatively larger changes in the X dimension of the expanded beam that is projected into the volume of the stationary gain medium.

19. The apparatus of claim 18, wherein the voxel projector is stationary, and wherein orientation changes by the scanning mirror control changes in the X and Y dimension of the expanded beam that is projected into the volume of the stationary gain medium.

20. The method of claim 17, further comprising two or more lenses, located between the scanning mirror and the voxel projector, to adjust the light beam in a Z-direction into and out of the volume of the stationary gain medium, wherein the two or more lenses are stacked in the Z-direction and selectively actuated on a lens-by-lens basis to adjust the light beam in the Z-direction into and out of the volume of the stationary gain medium.

* * * * *